Nov. 6, 1951  S. KHALIL  2,574,267
DIFFERENTIAL TIRE
Filed March 12, 1948  2 SHEETS—SHEET 1
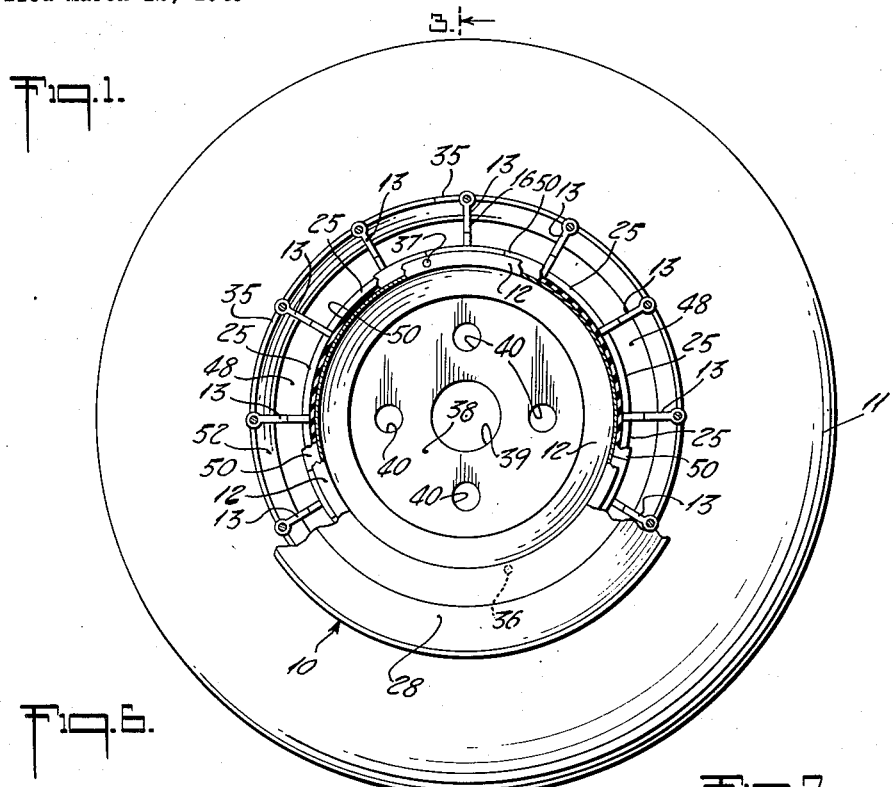
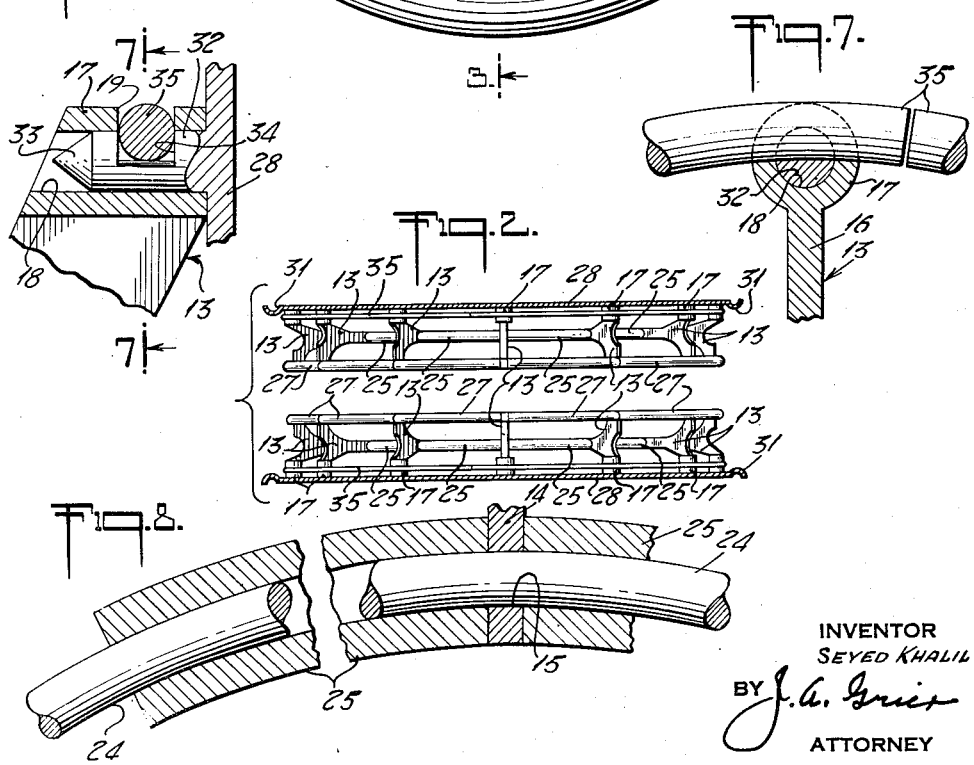
INVENTOR
SEYED KHALIL
BY
ATTORNEY

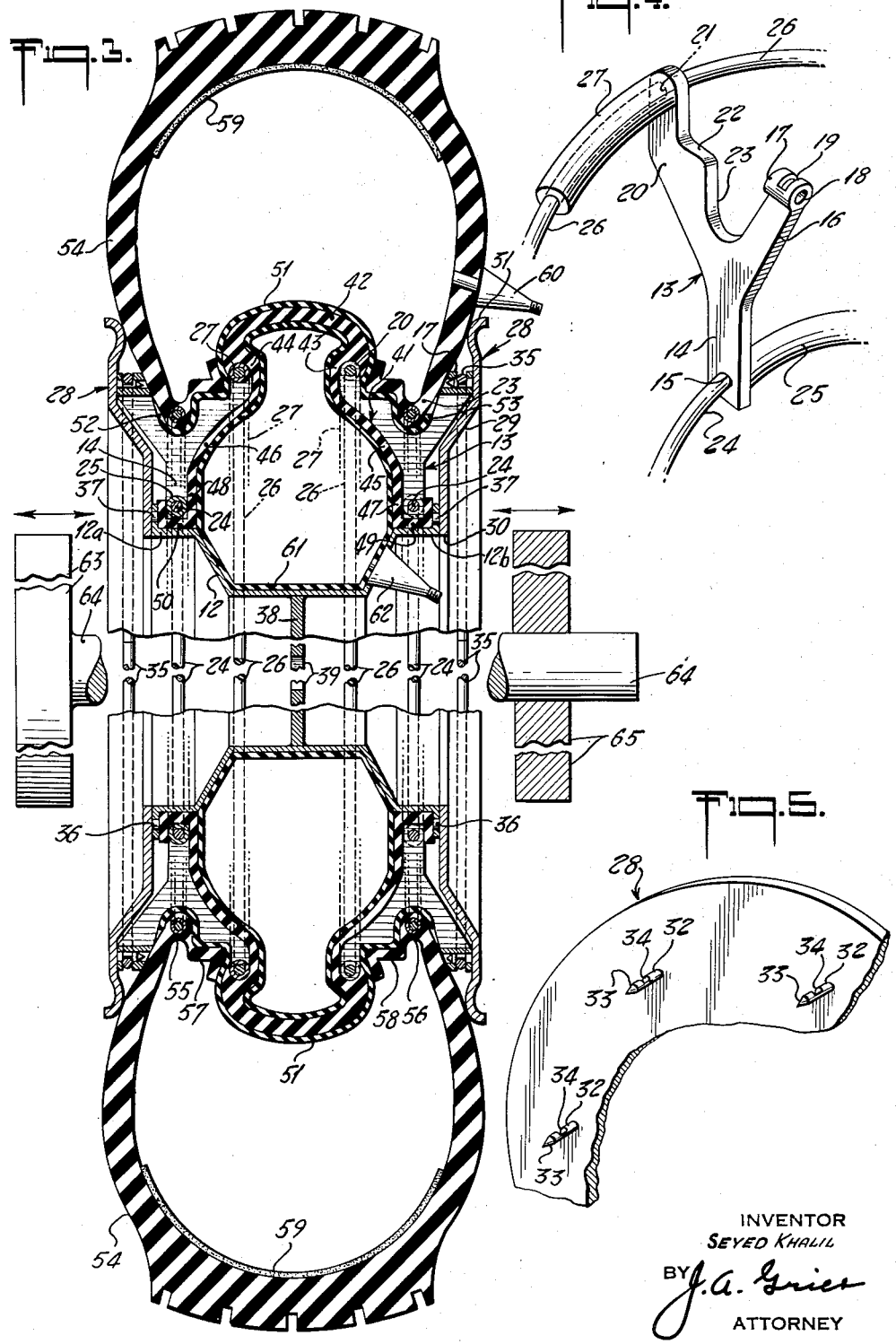

Patented Nov. 6, 1951

2,574,267

UNITED STATES PATENT OFFICE 2,574,267

DIFFERENTIAL TIRE

Seyed Khalil, New York, N. Y.

Application March 12, 1948, Serial No. 14,469

20 Claims. (Cl. 152—9)

This invention relates to a differential tire comprising a pneumatic tire having lateral and radial flexures which are acting differentially, and a composite wheel which is concentrically interposed between said tire and a conventional wheel of a vehicle, and which normally functions like a resilient wheel and at other times functions like a solid wheel.

One object of this invention is to provide a composite wheel which may be readily mounted on and dismounted from the rim of a wheel of a vehicle without requirement of any change to either the rim or the wheel.

Another object of this invention is to provide a composite wheel of sufficient physical strength to be able to support per se the weight and the load of the wheel upon which it is mounted.

Still another object of this invention is to provide a composite wheel and a differential pneumatic tire having an inner perimeter which is adapted to be readily mounted on and dismounted from said composite wheel.

Again, another object of this invention is to provide a composite wheel mounted between a pneumatic tire and a vehicle wheel, and to provide a pneumatic tube which, when mounted in said composite wheel, enables it to function like a resilient wheel.

Still another object of this invention is to provide a composite wheel having a portion which has radial resiliency, which wheel is adapted to be mounted on a vehicle wheel, and the provision of a differential pneumatic tire mounted on said composite wheel and adapted to be flexed laterally, and a portion of which has radial resiliency to cooperate with said first mentioned portion to produce an alternating cushion.

Another object of this invention is to provide a differential pneumatic tire in combination with a differential resilient wheel, both of which are concentrically mounted on a conventional wheel of a vehicle to produce a compound cushion with positive and dependable lateral stability.

Again, another object of this invention is to provide a composite wheel mounted on a vehicle wheel, a differential pneumatic tire mounted on said composite wheel, and means to prevent said composite wheel from being ejected from said vehicle wheel due to centrifugal force when both said vehicle wheel and the composite wheel thereon, are rotating.

A further object of this invention is to provide a composite wheel mounted on a vehicle wheel, a tire mounted on said composite wheel, and means to prevent said tire from being ejected from said composite wheel due to centrifugal force when said vehicle wheel and the composite wheel and the tire thereon are rotating.

Still another object of this invention is to provide a composite wheel and a pneumatic tube therein forming a resilient wheel, means to insert said wheel between a differential pneumatic tire and a vehicle wheel, and means to prevent said resilient wheel and said pneumatic tire from being affected if and when said pneumatic tube loses air.

Again, another object of this invention is to combine a composite wheel and a pneumatic tube to form a resilient wheel, means to position said wheel between a differential pneumatic tire and a vehicle wheel, and means to prevent said resilient wheel from being affected if and when either said pneumatic tube or said pneumatic tire, or both, lose air.

Another object of this invention is to provide a composite wheel and a pneumatic tube therein adapted to form a resilient wheel, a pneumatic tire including a tube, means to position said resilient wheel between said pneumatic tire and a vehicle wheel, and means to prevent said tire from being ejected from said wheels if and when either first or second mentioned tubes, or both, lose air.

My composite wheel, which takes the place of a primary casing, will neither flatten nor jump out from the rim upon which it is mounted when the tube in said composite wheel loses air.

When the tube in said composite wheel loses its air, the vehicle may be driven without interruption.

The loss of air from said composite wheel will reduce the differential cushion of the vehicle to a simple cushion similar to the cushion of a tire of the prior art.

Since the differential casing is air-tight, a puncture healing compound may be used on the inner surface of said casing instead of said tube. This will eliminate the flattening of said differential casing as a result of a puncture.

Composite wheel

In the preferred form according to my invention, the composite wheel is made of a combination of several parts, some of which are formed of metal and others of rubber.

The rubber parts consist of (1) a tube which is similar to a pneumatic tube of the prior art, and which is called herein a primary tube; and (2) a casing which is made preferably of the same material of which casings of the prior art are made, and which is called herein a "bag."

The metal parts consist of: (a) two ring-like plates which are adapted to be mounted each on one side of the rim of a vehicle wheel, and which are strong enough to support the weight of their vehicle by themselves without any air pressure or other assistance; (b) a plurality of fork-like elements, generally in the form of a Y, which are spaced apart from each other by means of spacers, the array of said elements and spacers being held together by means of two annular rings.

These arrays of fork-like elements are mounted on the rim of a vehicle wheel in substantially the same position as are the beads of a casing of the prior art. They are adapted to firmly hold said ring-like plates against the rim of the vehicle wheel.

There are, in each of my composite wheels, two such arrays, each of which is adapted to hold one of said ring-like plates against said rim.

The rubber "bag" is mounted between the two arrays of fork-like elements and spacers.

The sides of said bag are prevented from flexing by said arrays whereas an annular central part of said bag, lying between said arrays, is subject to flexure by air pressure.

On the outer surface of the base of said composite wheel, just beneath the central part of each of said fork-shaped elements, an annular recess or groove is provided into which are mounted the locking projections of the differential casing.

Differential casing

My differential casing forms an envelope that is adapted to form an air-tight compartment which can be inflated without the necessity of using a conventional tube.

It has a plurality of locking projections which enter in and cooperatively engage the annular recess on said composite wheel thereby providing a positive and firm interlocking means between said composite wheel and the differential casing.

It is subject to both lateral and radial flexure as will be presently explained.

Lateral and radial flexures

My improved casing flexes in a manner similar to flexure of casings of the prior art, except that such flexure is of less magnitude for a given set of conditions, for the reason that some of the forces are diverted and caused to act radially, as will be explained hereinafter. For the sake of distinction and reference, it will be called "lateral flexure." The lateral flexure is adapted to affect the side walls of a casing.

My composite wheel is not adapted to undergo lateral flexure, however, its construction is such that it is adapted to be flexed in an entirely new manner, which might be termed "radial flexure."

This radial flexure occurs in an annular central band formed in the base of my composite wheel.

Said differential casing also has radial flexure in addition to its lateral flexure.

Radial flexure takes place at the central part of the section of said differential casing which is adapted to intersect the base of said composite wheel.

The radial flexure of the differential tire is produced by an increase in the pressure of air in said tire, whereas the radial flexure of the composite wheel is produced by the radial flexure of said tire.

For example, the lateral flexure of the differential casing causes the air in said casing to press in all directions and as a result produces radial flexure which is substantially ninety degrees relative to its lateral flexure and is consequently in a plane perpendicular to the axis of the vehicle wheel.

Said radial flexure being upwardly in the opposite direction from the ground, it presses up against the position of the base of said composite wheel which is in contact therewith and enables said base to produce its own radial flexure.

Limits of lateral and radial flexure

The lateral flexure of my differential casing (just as the lateral flexure of a casing of the prior art) is not limited by the physical body (flexibility of the casing, itself). It has a functional limit controlled by air pressure in said casing.

Everything else remaining constant, the less the air pressure the greater the lateral flexure.

The radial flexures of both the differential casing and my composite wheel are limited by the flexibility of material used in the particular position of said differential casing and the portion of the composite wheel where said radial flexures are adapted to take place.

In addition to their physical limits, said radial flexures have a functional limit within the range of said physical limits.

The functional limits of said radial flexures are controlled by air pressure in said differential casing and in said composite wheel, respectively. If there is no air pressure in said composite wheel, the air pressure in said casing controls the magnitude of said radial flexures only until the magnitude reaches the physical limits of said casing.

Thus, the less the air pressure the less the magnitude of radial flexures, and conversely, the greater the air pressure the greater the magnitudes of the radial flexures.

Alternating cushion

The radial flexures in my composite wheel and differential casing combined with the lateral flexure of said casing provide what is called herein an alternating cushion.

As an example of such alternating cushions, suppose that the air pressure in the composite wheel is greater than the air pressure in the differential casing. The differential casing as it contacts the ground (due to rotation of its conventional wheel) starts to undergo lateral flexure somewhat in the same manner as a casing of prior art does.

The composite wheel, being inflated with greater air pressure, will not be instantly affected by said lateral flexure.

As said differential casing continues its contact with the ground, it adds to the magnitude of said lateral flexure.

When said lateral flexure reaches a given magnitude it causes the central part of the intersection of said casing and the composite wheel to undergo their radial flexures, that is, to raise the intersecting section of the differential casing to form a radial flexure which, in turn, presses against the intersecting section of the composite wheel, compelling the same to also be flexed radially.

As radial flexure of said differential casing compels said composite wheel to produce its own radial flexure, the pressure of air in said composite wheel forces said radial flexure of said wheel to rebound and causes also said radial flexure of said casing to rebound and produces a radial flexure of its own in the inverse direction. This process of rebounding of the radial flexures of the composite wheel and the differential casing produces what is called herein an alternating cushion.

*Friction versus cushion*

A motor vehicle advances forwardly or backwardly due to frictional contact between its wheels and the ground.

As a wheel rotates a part of its tire contacts the ground while an adjacent part of said tire which had just previously been in frictional contact with the ground has moved out of said frictional contact.

To make frictional contact of the wheel with the ground is an easy thing, but to release frictional contact from the ground is not so easy.

*Assembling my tire*

The assembling of several parts of my tire and composite wheel and the mounting of both of them on the rim of a vehicle wheel may be done in the following order.

(A) Said rubber bag is mounted over said two arrays of fork-like elements;

(B) Said primary tube is inserted in said bag;

(C) Said tube is slightly inflated;

(D) Said bag (together with its tube and the two arrays of fork-like elements) is mounted in said differential casing;

(E) In mounting said bag and the two arrays on said differential casing, one should be sure that the two guarding projections of the differential casing enter their respective recesses which are provided in the base of said bag.

Indeed, one object of said projections and recesses is to use them as a guide for mounting said bag and differential casing together.

Another object of said projections and recesses is to enable the open edge of said differential casing to be disposed and held at a given position relative to said bag.

A further object of said projections and recesses is to prevent said differential casing from being laterally displaced relative to said bag.

(F) After mounting said differential casing and bag together, the differential casing or its tube, as the case may be, is slightly inflated.

(G) The parts which are assembled and inflated as described under (F) are mounted on the rim of a vehicle wheel.

(H) Said two ring-like plates are mounted one after another on their respective arrays of fork-like elements and held there, each by a spring ring, as shown on the accompanying drawings.

In mounting said ring-like plate, care should be taken that the two dowel pins in each of said plates seat in their cooperative holes.

In assembling the plates on each side of the rim, pointed pins are provided on the plates to enter holes formed in bosses carried by said fork-like elements, and under ordinary conditions, these pointed pins are entered into said holes and as the plates are moved in toward the rim, dowel pins encounter dowel holes and correct the alignment. However, in garages, etc., where it is desirable to mount the plates on the rims rapidly, I provide a mandrel or gauge which ensures alignment of the plate with the rim, so that a mechanic can rapidly apply the plates to each side of the rim, and after doing so, the mechanic may snap the spring rings on to form slots formed on the pointed pins, and thereafter, he may remove the mandrel and go on to the next one.

The last step is to inflate my differential casing and the resilient wheel.

Although the assembling process may be more or less varied from the above described order, it is preferable, where any part is to be removed, to follow the above steps in reverse order.

After assembly, my resilient wheel and differential casing are interlocked with each other and with the rim, so that neither weight nor lateral stresses can change the relations of the several cooperative elements.

*Lateral stability*

It can be seen, from the above, that I have provided a resilient wheel with firm and positive lateral stability.

*Advantages of fork-like elements*

My fork-like elements, singly as well as in combination with other elements of my composite wheel and differential tire, have a number of advantages, some of which are:

(1) To provide lateral stability in my tire. This is done by preventing the side walls of my composite wheel from being flexed due to the rigidity imparted thereto by said fork-like elements;

(2) To enable the composite wheel to flex radially at a given section of its base only. This is done by the arms of said elements which imparts rigidity to the corners between said side walls and base of said composite wheel, thereby leaving only a central section of the base of said wheel free to flex;

(3) To enable the casing to flex radially at a given section of the center of the inner periphery thereof. This is done by the arrays of said elements in cooperation with the rims. If the entire inner periphery of said casing is, by the pressure of air therein or by any other cause, forced to flex radially, the boundary of said periphery which is bearing against the arms of the forks could not flex radially as the open ends of their stems are, by a vehicle wheel upon which said casing and composite wheel is mounted, prevented from radial displacement;

(4) To provide a close radial contact between the outer periphery of said composite wheel with the inner periphery of said casing. This is done by said arms which prevent the section of the base of said composite wheel, adjacent to the arms of said elements, from flexing radially. Consequently, air pressure radially urges said casing against said section of said composite wheel and provides a firm frictional junction between said casing and composite wheel;

(5) To reinforce the recesses of the composite wheel by the arms of said elements in order to prevent said recesses from expanding or contracting;

(6) To prevent said composite wheel from being removed from said casing due to loss of the air in said composite wheel, centrifugal force, etc. As described elsewhere, the composite wheel should be deformed radially for either mounting the same on said casing or removing it from said casing;

(7) To enable said composite wheel and casing to be assembled together. This is done by shifting said forks radially in the direction of the open ends of their stems and consequently, reducing the overall diameter of said composite wheel, then inserting the deformed composite wheel in said casing. After having been inserted in the casing, said wheel retakes its normal form;

(8) To enable said composite wheel with its casing to be assembled on a vehicle wheel, particularly on a non-split rim, such as for example a center-drop wheel;

(9) To prevent the interlocking projections of said casing from being ejected from the recesses of the composite wheel as a result of loss of the air in said casing, centrifugal force, etc.

As described elsewhere in this specification, my differential casing and the composite wheel are held together by the interlocking projections and recesses that are provided in said casing and composite wheel, respectively.

The interlocking projections cannot be ejected from their recess without ejecting therewith the universal rings. I means the two rings which are respectively incorporated in the projections of said casing. No such radial motion can be imparted to any one of said rings because the portion of the ring which is 180° away from the position where said motion is imparted to said ring will, due to its direct contact with the prong of the nearest fork, prevent said ring from shifting; and

(10) To enable said casing to remain airtight. If the two edges which are adapted to form entrance to the interior of said casing and which are held against said composite wheel airtight, are by pressure of the air in said casing or by any other means, forced to be pulled apart laterally toward the outside of said casing (which will open said entrance), the lateral expansion of said edges will, due to the contact of said interlocking projections with the arms of each of said forks, be prevented by the resistance of said forks.

Referring to the drawings, which are given by way of example, to illustrate the invention:

Figure 1 is a side elevation with portions broken away to illustrate my new and improved resilient wheel;

Figure 2 is a plan view of two arrays of my new and improved fork-like elements, mounted on rings with spaces therebetween and showing the side plates with their pointed pins mounted in the bosses on said fork-like elements, and locked therein by means of spring rings engaging slots formed in said pointed pins;

Figure 3 is a sectional elevation, taken along the lines 3—3 of Figure 1;

Figure 4 is a perspective of one of my fork-like elements, showing how it is assembled on two rings with spaces for maintaining said elements in predetermined spaced relation to each other;

Figure 5 is a fragmentary, perspective view of one of my side plates;

Figure 6 is a sectional view, showing a side plate with one of its pointed pins positioned in a hole in a boss carried by my fork-like element, and showing a locking ring positioned thereon for securing said side plate to the array;

Figure 7 is a sectional elevation, taken along the lines 7—7 of Figure 6; and

Figure 8 is a sectional view, showing one of the fork-like elements with its lower end traversed by a holding ring and with arcuate spaces on each side thereof.

Referring now to Figure 1, my invention includes a composite wheel generally designated by the numeral 10, upon which is mounted my differential tire 11, following which the assembly is mounted on the rim 12 of a vehicle.

The composite wheel 10 includes metallic parts and rubber parts. The metallic parts will first be described.

Referring to Figure 4, a fork-like element 13 has a vertical body portion 14, the lower portion of which has a hole 15 formed therein. Formed integral with the body portion 14, is an arm 16 which has, formed integral with its upper end, a boss 17 having a central hole 18 therethrough. A slot 19, formed in the boss, communicates with the hole 18.

Also formed integral with the body portion 14 is a second arm 20, the upper end of which is semi-circular and which contains a hole 21. Between the arms 16 and 20, a step or land 22 is formed substantially parallel to the base of the element 13, and between the land 22 and the arm 16 is a V shaped slot 23, the bottom of which is rounded.

In assembling a plurality of elements 13, an annular ring 24 is passed through the holes 15 in the elements, and between each element is positioned a curved tubular section 25 of such length as necessary to evenly space the elements. A second annular ring 26 is passed through the holes 21 in the elements and between each element and its neighbor is positioned a curved tubular spacer member 27.

In Figure 2 is shown two assemblies or arrays of fork-like elements 13 with their rings and spacers described above. These two arrays are employed in the composite wheel 10, and for the sake of clarity the differential casing is omitted as well as the rubber parts of my composite wheel.

Figure 2 also shows in each array, ring-like plates which are identical and each is generally designated by the numeral 28, and consisting of a stepped annular ring 29 having an inner hole 30 (Figure 3) which may be the same as the inner diameter of the rim 12. The outer portion 31 of the plate is flared inwardly and rounded outwardly as shown in Figure 3.

Each plate has projecting from one face thereof, as may be seen in detail in Figure 5, a plurality of pins or studs 32, having conical points 33 formed thereon. Each stud has a slot 34 formed therein. These plates are mounted on the two arrays after the array assembly with its rubber parts, and carrying my differential tire, is mounted on the rim 12. Since the mounting of these plates might be more clearly understood if the composite rubber parts and the differential tire are omitted, this mounting is at first described in connection with Figure 2.

In Figure 2, each plate 28 is held in a position where each conical point 33 is in alignment with a hole 18 in boss 17, so that when the plate is pushed in laterally, the studs 32 enter the bosses 17 of its array, and when the plate is firmly against the outer faces of the bosses, the slots 34 in the studs are aligned with the slots 19 formed in the bosses, so that a split snap ring 35 may be snapped on to embracingly engage said aligned slots and thereby retain the plate thereon. The plate 28 on the second array is mounted in the same manner. Figures 6 and 7 show the snap ring 35 locking the studs 32 in the bosses

17. The plates 28 carry dowels 36, which may be oppositely disposed thereon, and which engage corresponding dowel holes 37 in the rim 12. The rim 12 has a central annular web 38 with a central hole 39 therein about which is disposed a plurality of mounting holes 40.

Referring now to Figure 3, I show the entire assembly. Before placing the two arrays shown in Figure 2 (the snap rings 35 and the plates 28 having been removed) on the rim, the casing or "bag" 41 is assembled with these arrays. The casing or bag 41 has a dome-like portion 42, the sides of which overhang annular grooves which snugly fit over the portions of each array composed of the rounded ends of the arms 20 and the spacers 27 therebetween. Joining the portion 42 are depending web portions 43 and 44 which converge, respectively, as web portions 45 and 46 and join depending webs 47 and 48, which carry annular channeled extensions 49 and 50, respectively. The annular grooves formed in these channeled extensions are rectangular in cross-section to accommodate the inner ends of the body portions 14 of the elements 13, the inner ends of the elements and the spacers therebetween of one array being positioned in one groove, and the inner ends of the elements and their spacers of the other array being positioned in the other groove.

A pneumatic tube 61 is then positioned in the casing or bag 41 and is partially inflated as aforesaid. This procedure is suggested by way of example.

An annular rubber-like member 51 is placed in embracing relation to the dome-like portion 42 and side portions of this member follow the contours of the arms 20, the lands 22, and terminate on the curved surfaces of the V shaped slots 23—one side portion terminating at 52 and the other at 53, Figure 3.

My differential casing 54 is mounted with its bead 55 positioned in the V shaped slots and in contact with the side portion terminating at 52 in one of said arrays, and with its bead 56 positioned in the V shaped slots and in contact with the side portion terminating at 58 in the other of said arrays. Extending inwardly from the bead 55 is an annular tab 57, which overlies one side portion of the member 51 and terminates thereon adjacent to the arms 20 and spacers 27 of one array. Likewise, a second tab 58 extends inwardly from the bead 56 and overlies the other side portion of the member 51, terminating thereon adjacent to the arms 20 and spacers 27 of the other array.

My differential casing may have a coating 59 of a compound for healing punctures, and an air valve 60 is provided for inflating it. When the tire 54 is inflated, the air pressure presses the annular tabs 57 and 58 into fluid-tight contact with the side portions of the member 51.

After the differential casing 54 is mounted as described above, with the pneumatic tube 61 positioned in the casing or bag 41, the entire assembly is mounted on the rim in the manner in which an ordinary casing is usually mounted on its rim. The tube 61 is provided with an air valve 62 which projects through a corresponding hole in the rim 12.

After the assembly is mounted on the rim, one of the side plates 28 is applied by starting the studs 32 into the holes 18 in the bosses 17 and pressing the ring 28 inwardly until the dowel pins 36 either enter the dowel holes 37 or are stopped by the rim (if exact alignment is not had). If the dowels are not aligned with the dowel holes, a slight shift in a clockwise or counter-clockwise direction will effect the alignment of them, so that the dowels can enter the dowel holes and allow the plate 28 to come to rest against the rim on the one hand and against the bosses 17 on the other hand. The conical points 33 on the studs 32 facilitate the application of the plates 28.

After the plate contacts the rim and the bosses, as aforesaid, the split spring ring, or snap ring 35, is snapped into the aligned slots 19 in the bosses 17 and 34 in the studs 32, and thus the plate is positively locked in relation to the rim. The other plate, on the opposite side, is then applied and locked in with its snap ring 35, following which the tube 61 and the differential casing 54 may be inflated to the desired pressures.

In garages, etc., where rapid assembly of the tire of my new and improved device is to be effected, a mandrel, including a disc-like head 63, a shaft 64, and a disc-like member 65, fitting the shaft 64, may be employed for ensuring alignment of the plates 28 with the straight portions 12a and 12b of the rim. The head 63, for example, fits the portion 12a of the rim and the disc-like member 65 fits the portion 12b of the rim (or vice versa). The mandrel is positioned in the rim and the head 63 and the member 65 maintain alignment of the plates with the rim. After assembly, the mandrel may be very easily removed by pushing the shaft 64 to the left, as seen in Figure 3, and removing the disc-like member 65 from it.

Although I have herein shown and described by way of example, one embodiment of my new and improved tire device, it is obvious that many changes may be made in the arrangement herein shown and described within the scope of the following claims.

What is claimed is:

1. In a pneumatic device, a composite structure adapted to be mounted on the rim of a vehicle and including a series of radially disposed members having depressed portions therein adapted to receive and support the beads of a pneumatic tire, said structure also being adapted to impart lateral stability to said tire.

2. In a laterally stable tire device, a composite wheel structure including a plurality of sets of radially disposed members rigidly secured together, each set having an annular depression therein spaced apart from the circumference thereof, a pneumatic tire mounted on said structure with its beads engaging said depressions, said tire being fluid-tight and adapted to be inflated.

3. A composite wheel for imparting lateral stability to a pneumatic time mounted thereon, said composite wheel including a pneumatic core, an array of supporting elements on each side of said core, said elements having depressed portions adapted to receive the beads of said tire, and side plates on each side of said array interlocked therewith, said tire between said beads being in fluid contact with said core and adapted to flex the latter under the urge of forces encountered by said tire in use.

4. In a laterally stable compound tire device, an outer pneumatic casing, a composite wheel between said casing and the rim of a vehicle, including a rigid structure having an annular depressed portion adapted to receive one bead of said casing, a second rigid structure spaced laterally from said first rigid structure and having an annular depressed portion adapted to receive the other bead of said casing, an annular pneumatic element between said rigid structures and having its periphery extending radially beyond said structures, said periphery extending into said casing between said beads and forming at least in part a common wall between said casing and said pneumatic element, and a side plate or flange outside of and in contact with each of said structures and interlocked with said rim.

5. In a device of the character described, a rigid structure to be mounted on the rim of a vehicle, said structure being comprised of two spaced arrays of radial members to receive the beads of a tire, and a cavity between said arrays, a pneumatic tire embedded in said cavity with its outer periphery extending beyond said structure, said tire being arranged to be flexed radially, and a second pneumatic tire mounted on and having beads engaging said structure and having at least a portion of its inner periphery lying upon and in flexible cooperative relation with the outer periphery of said first tire.

6. In a pneumatic device, a composite wheel including rigid annular side portions with a pneumatic core therebetween, said rigid annular side portions each including an array of radial elements having an annularly disposed seat to receive the bead of a tire, and a pneumatic tire mounted on said composite wheel and having a substantial portion of its inner periphery contacting said core and adapted to cause said core to be flexed radially, said core and said tire having inflation chambers independent of each other and having individual inflation valves.

7. A composite wheel having rigid side walls sufficiently strong to support its proportion of the weight of a vehicle upon which it is mounted, said composite wheel comprised of a pair of spaced rigid structures, each formed of an array of radially disposed elements, said composite wheel being disposed between a rim and a tire, a pneumatic core within said composite wheel for causing the latter to function as a resilient wheel when said core is inflated, and means for inflating said tire and said core independently, 8. In a compound tire device, an outer pneumatic casing, an inner composite unit including two sets of spaced radial elements secured together and concentrically mounted between said outer casing and the rim of a vehicle, said inner unit including an annular pneumatic element the outer periphery of which is in contact with and flexibly cooperates with the inner periphery of said outer casing, air pressure in said outer casing and said element conjointly providing a cushion for said vehicle, said element being adapted to be flexed radially under the urge of forces transmitted to it via said outer casing.

9. In a device of the character described, a pneumatic tire having a rigid structure on each side thereof and in lateral contact therewith and adapted to discourage lateral flexure, the outer periphery of said tire extending beyond the periphery of said structure and being convex in form, and a pneumatic tire having beads supported on said structure and having an inner peripheral portion spanning the space between the beads thereof and in intimate contact with the outer periphery of said first tire and adapted to flex the latter radially.

10. An annular resilient member mounted on a rim and having beads and embraced by a pneumatic tire having a closure wall extending from one bead to the other bead thereof, at least a substantial portion of the outer periphery of said resilient member being in contact with at least a substantial portion of the closure wall of said tire, and means on each side of said resilient member for discouraging lateral flexure of said member, yet permitting the same to be flexed radially, said means forming a support for said pneumatic tire.

11. A tire device including a circular array comprised of a plurality of prong-like elements with spacer means therebetween, said array being generally circular in form, and means for maintaining said elements and spacer means in said array.

12. A tire device including a circular array comprised of a plurality of radially disposed prong-like elements, each having a V-shaped depression therein extending outwardly, spacer means between said elements, and means engaging said elements and said spacer means for maintaining them in said array.

13. A tire device including a circular array comprised of a plurality of radially disposed prong-like elements, each having a V-shaped depression therein extending outwardly, spacer means between said elements, and ring means passing through said elements and said spacer means for maintaining them in said array.

14. The invention according to claim 13 in which said ring means is comprised of a ring engaging said elements and said spacer means adjacent to the inner periphery thereof, and a second ring passing through holes formed in at least corresponding arms of said elements.

15. The invention according to claim 13 in which each of said prong-like elements is generally Y-shaped, holes to receive said ring means being formed in corresponding prongs, a boss formed integral with the other prong of each of said elements, said bosses having their axes extending laterally, a central hole formed in each boss, a slot formed in each boss communicating with its hole, said holes being adapted to receive slotted pins carried on a side plate or flange fitted thereto after assembly, and a snap ring adapted to lie in said slots and lock said pins in said bosses.

16. A laterally stable compound tire device, an outer pneumatic casing, a composite wheel between said casing and the rim of a vehicle including a pair of spaced arrays disposed between the flanges of said rim, each array including a plurality of prong-like elements generally Y-shaped, holes near the extremities of corresponding prongs in each array to be engaged by retaining means, a boss formed integral with the other prong of each of said elements, said bosses having their axes extending laterally, a central hole formed in each boss, a slot in each boss communicating with the hole therein, a side plate or flange for each side of said composite wheel, said side plates carrying slotted pins with pointed ends adapted to fit the holes in said bosses, and a snap ring for each side plate, each adapted to embrace the slots in its array and lock said pins in said bosses, thereby locking said side plates in contact with the outer surfaces of the flanges of said rim.

17. In a compound tire device, a composite wheel comprising a pneumatic core sandwiched between an independent pair of spaced rigid elements, said composite wheel being mounted between a pneumatic tire and a rim, each rigid element being comprised of an array of radial members with spacers therebetween and adapted to support said tire, said tire having beads and a closure wall extending from one bead to the other therein, said core being adapted to pneumatically cooperate with the closure wall of said tire when both are inflated to produce a compound cushion, said elements being adapted to impart lateral stability to said tire.

18. In a compound tire device, a composite wheel comprising a pneumatic core sandwiched between an independently inflatable pair of spaced rigid elements, each rigid element being comprised of an array of radial members with spacers therebetween and said composite wheel being mounted between a pneumatic tire and a rim and adapted to support said tire, said core being adapted to pneumatically cooperate with said tire when both are inflated to produce a compound cushion, said elements including means adapted to interlock the members of said rigid elements with said rim and thereby to provide positive lateral stability to said device.

19. In combination, a vehicle wheel having annular rim extensions providing a channel therebetween, independently inflatable flexible pneumatic means in said channel and means to inflate the same, a pneumatic tire mounted on said rim and having a flexible inner periphery in fluid contact with said pneumatic means, and means to inflate said tire, whereby said tire and said pneumatic means cooperate with each other to provide a compound cushion.

20. In a laterally stable tire device, a composite wheel including rigid annular side portions spaced apart from each other, means between said portions and adjacent to one of them carrying a series of depressions annularly disposed, a second means between said portions and adjacent to the other of them carrying a like series of depressions annularly disposed, said depressions being adapted to support the beads of a pneumatic tire, a pneumatic core between said means and consequently between both said series of depressions, and a pneumatic tire mounted on said composite wheel and having its beads engaging said series, said pneumatic tire also having the portion of its inner periphery between said beads cooperating with said pneumatic core and adapted to cause the latter to be flexed radially.

SEYED KHALIL.

REFERENCES CITED

The following references are of record in the file of this patent:

UNITED STATES PATENTS

| Number | Name | Date |
|---|---|---|
| 1,492,175 | Miller | Apr. 29, 1924 |
| 1,923,975 | Harlan | Aug. 22, 1933 |
| 2,231,745 | Altmyer | Feb. 11, 1941 |